2,954,883

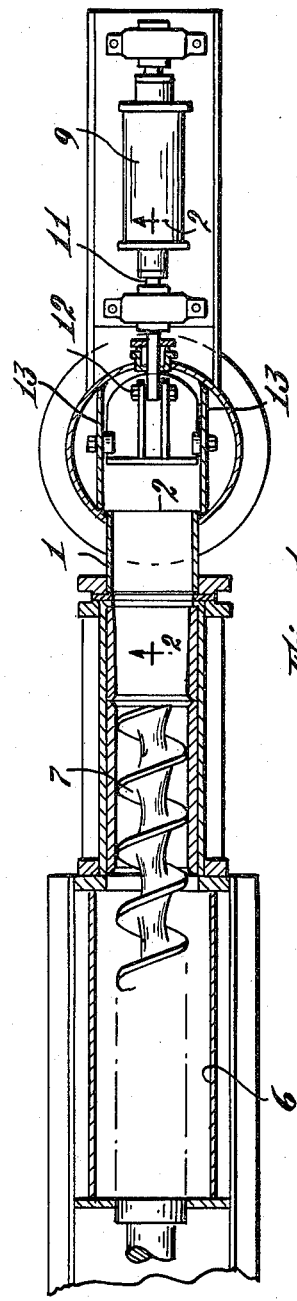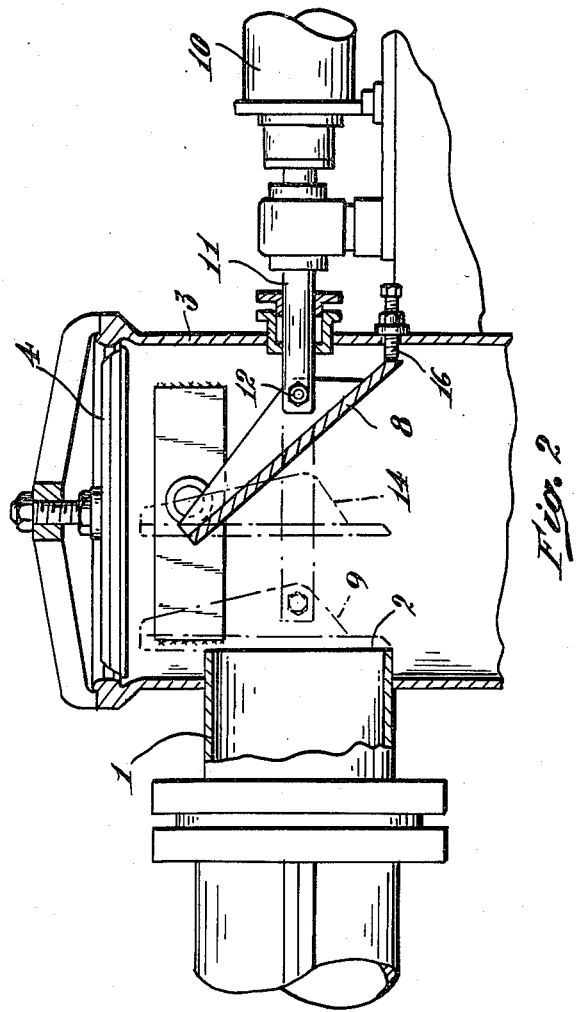

APPARATUS FOR CONTINUOUSLY FEEDING COMPACTIBLE MATERIAL INTO A PRESSURIZED TANK

Leonard G. Durant, Pittsfield, Mass., assignor to E. D. Jones Corporation, Pittsfield, Mass., a corporation of Delaware Filed July 13, 1959, Ser. No. 826,733

2 Claims. (Cl. 214—17)

In continuously processing compactible materials, such as wood chips, straw, bagasse, cotton linters and other cellulosic materials, in pressurized tanks, it has been common practice to feed the material through a duct having an outlet communicating with the tank, compacting the material in the duct to a density sufficient to prevent loss of pressure in the tank. Owing to the difficulty of determining when adequate density is attained it has been customary to compact the material more than necessary to maintain the seal. This results in excessive wear on the duct and feed means and may result in damage to the material.

Objects of the present invention are to provide apparatus for automatically maintaining the desired density at the outlet, to relieve the compacting pressure when the density tends to rise above the desired value, to prevent blow-backs when the compacting pressure falls below the minimum necessary to maintain the desired density, to reduce power consumption, to reduce wear on the feed means, to prevent the material from being compacted into plugs so tight that they are difficult to break up, to close the outlet automatically when the feed means is stopped, and generally to improve the operation of apparatus of the character referred to.

According to the present invention the aforesaid outlet has a closure which opens inwardly of the tank in combination with pressure means for yieldingly urging the closure toward closed position, thereby to maintain in the duct an approximately constant density sufficient to maintain a predetermined pressure in the tank. Preferably the closure is free to tip and an off-center stop is positioned in the path of the closure to cause it to tip as it opens. In the preferred embodiment the pressure means comprises a piston and cylinder bearing on the back of the closure substantially in alignment with the axis of the outlet.

For the purpose of illustration a typical embodiment of the invention is shown in the accompanying drawings in which:

Fig. 1 is a horizontal section along the axis of the aforesaid duct; and

Fig. 2 is a section on line 2—2 of Fig. 1.

The particular embodiment of the invention chosen for the purpose of illustration comprises the aforesaid duct 1 having an outlet 2 communicating with the interior of the pressurized tank 3 having the usual clean-out opening sealed with a cap 4. Material is fed to the tank through a hopper 6 with an ordinary screw feeder 7.

According to the present invention the outlet 2 is provided with a closure 8 which is movable from the open position shown in Figs. 1 and 2 to the closed position shown by broken lines at 9 in Fig. 2. The closure is yieldingly urged toward closed position by means of a piston and cylinder 10 having a piston rod 11 which is pivotally connected to the back of the closure at 12, approximately in alignment with the axis of the duct 1. Disposed in the path of the closure 8 are two rollers 13 which engage the upper end of the closure when it reaches the position shown by broken lines at 14 in Fig. 2, thereby causing the closure to tip to the full-line position shown in the drawings as it continues to move back to the stop 16. In this inclined position the plug of compacted material is deflected and broken off in chunks which are loose and easily broken apart and which fall into the tank.

In starting the machine the closure is held in closed position until the material has been compacted in the duct 1 to a density sufficient to maintain a seal and then the closure is gradually retracted to permit the material to be discharged into the tank. Normally the pressure in the cylinder is adjusted to hold the closure in an intermediate tipped position, the closure moving toward closed position when the density tends to drop and toward retracted position when the density tends to rise, thereby maintaining the density approximately constant. When the supply of material is exhausted the closure moves to closed position automatically.

It should be understood that the present disclosure is for the purpose of illustration only and that this invention includes all modifications and equivalents which fall within the scope of the appended claims.

I claim:

1. For continuously feeding compactible material into a pressurized tank, appartus comprising a duct having an outlet communicating with the tank, a closure for said outlet which opens inwardly of the tank, pressure means for yieldingly urging the closure toward closed position, and means for compacting material in said duct and forcing it through said outlet against the counteraction of said pressure means, said closure being mounted to tip relatively to said outlet as it moves away from the outlet, thereby to deflect the compacted material to one side of the outlet.

2. Apparatus according to claim 1 further characterized by an off-center stop behind the closure to cause it to tip as it opens.

References Cited in the file of this patent

UNITED STATES PATENTS

| 1,737,090 | Meyers | Nov. 26, 1929 |
| 2,321,015 | Davis | June 8, 1943 |